Dec. 31, 1968  R. E. PHILLIPS  3,419,000
CARD FOR MEDICAL TESTING AND METHOD OF MAKING THE SAME
Filed Oct. 4, 1965
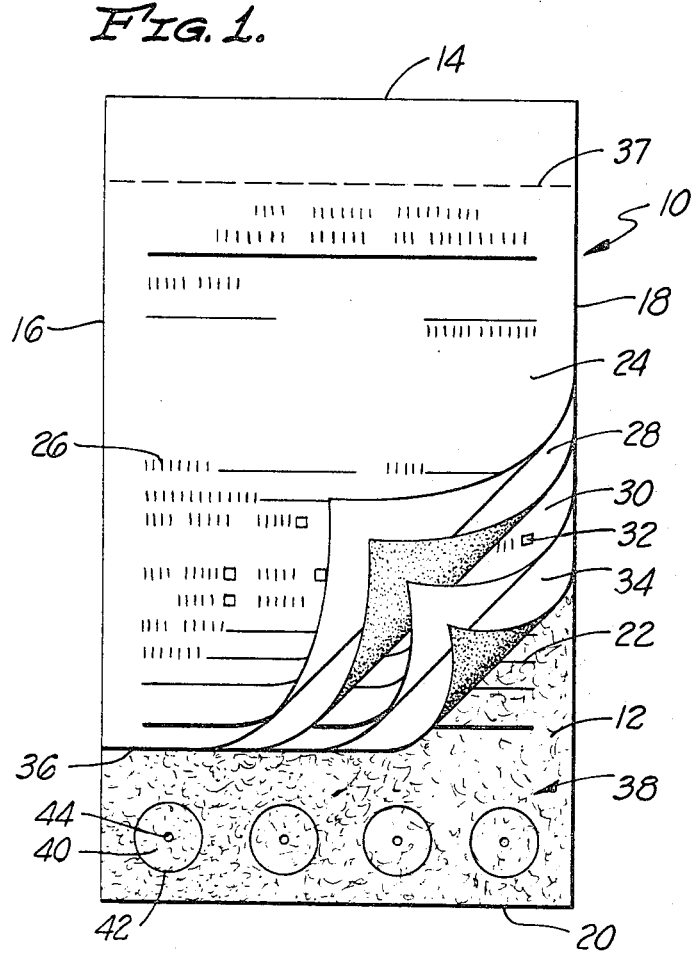
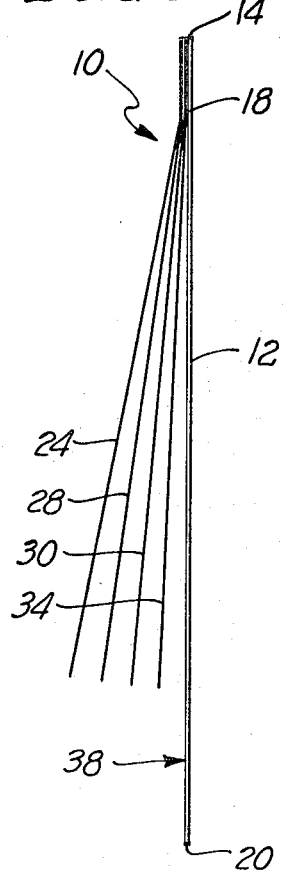
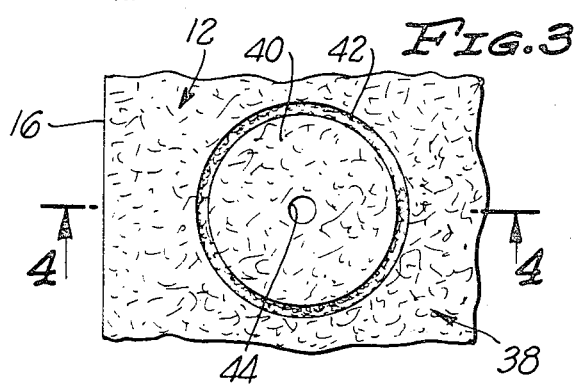
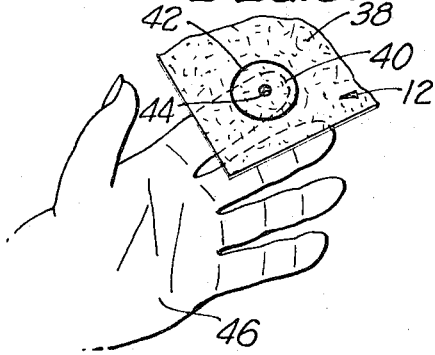
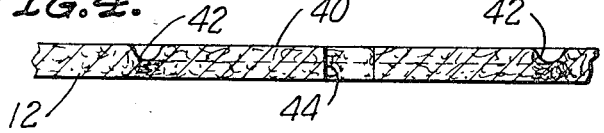
INVENTOR
ROBERT E. PHILLIPS
BY
EDWARD D. O'BRIAN
ATTORNEY

United States Patent Office 3,419,000
Patented Dec. 31, 1968

3,419,000
CARD FOR MEDICAL TESTING AND METHOD OF MAKING THE SAME
Robert E. Phillips, P.O. Box 1102,
Studio City, Calif. 91604
Filed Oct. 4, 1965, Ser. No. 492,677
8 Claims. (Cl. 128—2)

ABSTRACT OF THE DISCLOSURE

A card for medical testing is disclosed which is formed of an absorbent paper. The card has a line of compressed and charred card material defining an area and a hole for sighting purposes located within the area. During use the hole is employed in locating the area with respect to a blood source so that the area may be applied to it. Upon such application blood is absorbed by the card material and the line inhibits the migration of the blood out of the area.

---

This invention is directed to a card for medical testing, and particularly a card which is intended for the absorption and drying of body fluids, with the subsequent testing of a card, of a portion thereof, to determine the medico-biological characteristics of the dried body fluids.

A number of medico-biological tests are provided for body fluid testing. Some of these tests require that the body fluid be in the original liquid form, or be diluted in a particular liquid diluent. Some of these tests, however, permit or require that the body fluid be dried so as to test the solids of the former liquid without the testing of the liquid fraction thereof. One of these tests is the phenylketonuria test. This test is normally referred to as the P.K.U. test, for convenience. The card of this invention is particularly suitable for the P.K.U. test, but it is clear that the card described in this specification is useful for the testing of other body fluids, when the test thereof is of similar nature and requires a specimen which is impregnated into a suitable carrier, and subsequently at least some of the process steps of the testing are carried out while the sample is impregnated in the carrier material. It is difficult in such carrier material, particularly the porous, absorptive types such as filter paper, to control the amount of and positioning of the body fluid upon the carrier.

Accordingly, it is an object of this invention to provide a card for medical testing which is particularly designed for use in the absorption of body fluids in at least specific areas thereof so that the body fluids may be tested while being carried by the card.

It is a further object of this invention to provide a card for medical testing which is formed of absorptive material, such as filter paper, so that body fluids may be absorbed therein, dried therein, treated and subsequently tested.

It is a further object of this invention to provide an absorptive card for medical testing wherein the area in which the body fluid is to be impregnated is outlined both visually and functionally, so that while the body fluid is being impregnated therein, visual observation of complete filling of that area of the card is possible, and spreading of the body fluid into other portions of the card is inhibited.

It is a further object of this invention to provide a card for medical testing which has a specifically defined area in which the body fluid is to be impregnated, and a hole is provided in this area so that the person using the card can properly place the card for absorption of body fluid.

Other objects and advantages of this invention will become apparent from a study of the following portion of this specification, the claims and the attached drawings in which:

FIG. 1 is a front elevational view of the card for medical testing of this invention;

FIG. 2 is a side elevational view thereof;

FIG. 3 is an enlarged detail of a portion of the card of this invention, with parts broken away;

FIG. 4 is a further enlarged section taken generally along the line 4—4 of FIG. 3; and FIG. 5 is an isometric view of the card of this invention in position for the absorption of body fluids therein.

In order to understand this invention it can be stated in essentially summary form that it is directed to a card for medical testing. The card of this invention is preferably made of an absorbent material, such as filter paper. The functional portion of the filter paper has at least one area defined therein wherein the body fluid is to be soaked. In the P.K.U. test the body fluid is blood. The indicated area into which the body fluid is to be impregnated, is outlined by a line. This line comprises a compressed and slightly charred area of the filter paper. The line completely encloses the area to be impregnated. This compression and charring inhibits the migration of blood out of the defined area. Therefore, the filling of the entire area is improved. Furthermore, a hole is preferably placed substantially centrally within the defined area. This hole permits the defined area to be correctly placed on a blood spot. If desired or helpful, additional sheets may be attached to the test card so that information identifying the source of the body fluid can be provided in one copy or more.

This invention will be understood in greater detail by reference to the following portion of this specification wherein the drawings are described. Referring now to FIGS. 1 and 2, the card for medical testing is generally indicated at 10. The card 10 comprises an absorbent card 12 which is preferably made of filter paper, blotting paper or the like. The card 10 has a top edge 14, side edges 16 and 18. Furthermore, absorbent card 12 has a bottom edge 20. Card 12 may have indicia 22 printed thereon, which indicia are for the identification of the source of the body fluid sample, the test result information and/or other information.

In order to provide additional copies of this information, additional leaves are placed on the card 10. These leaves comprise, from front to back, sheet 24 which carries indicia 26 similar to the indicia 22. Behind the sheet 24 is carbon paper 28 which transfers the written identification impression from sheet 24 to the following sheet. If another copy is desired, sheet 30 with indicia 32 is also provided, again followed by carbon paper 34. Thus, when an identification impression is made upon sheet 24, it is transferred by the carbon paper to sheet 30 and card 12. Thus, the information is available in triplicate, while the body fluid sample is only provided for on absorbent card 12. Other conventional means for duplication may be employed, alternatively to carbon paper 28 and 34. If desired, a perforated tear-off line may be provided so as to readily remove sheets 24 and 30 as well as carbon papers 28 and 34 from the card 12. Such a tear-off line is indicated at 37. From FIGS. 1 and 2, it is seen that the top and side edges of sheets 24 and 30, as well as carbon paper 28 and 34, are in alignment with the top 14 and edges 16 and 18 of absorbent card 12.

However, absorbent card 12 is longer so that its bottom edge 20 extends past the bottom edge 36 of the sheets attached thereto. Thus, the lower portion of absorbent card 12 is exposed beyond edge 36. It is preferably within this exposed portion that the defined area for absorption of body fluid is defined.

The area for the absorption or impregnation of the body sample is generally indicated at 38. Referring now to FIGS. 1, 3 and 4, a particular absorption area is indicated at 40. One or more of such areas may be placed on the card 12, preferably within area 38. In FIG. 1, three more of such areas are indicated. The absorption area 40 is outlined by line 42, which completely encloses the absorption area 40 so as to define the area 40. Preferably, the edge 20 is related to the positioning of these absorption areas 40 on the card, so that the card 12 may be readily placed within suitable equipment for handling of coupons stamped from the absorption area 40 of the card 12.

Line 42 is formed by the application of heat and pressure by a suitable heated die mounted in a press which provides adequate pressure. Both heat and pressure are critical in forming the line 42 so that blood impregnated in absorption area 40 is substantially inhibited from flow across line 42. While heat and pressure are both critical, the temperature limits and pressure limits are unknown at present. However, the amount of temperature required is at least sufficient to cause slight charring of the absorbent card 12. Furthermore, the amount of pressure required must be enough to cause a permanent indentation when coupled with the charring effect caused by the temperature. It is believed that the two actions are interrelated so that with a slightly higher temperature, some less pressure is required. However, slight charring is critical together with adequate pressure to cause permanent indentation.

As an aid to filling the absorption area 40 with the impregnating fluid, usually blood, hole 44 may be provided adjacent the center thereof. In use, the card is filled out with suitable information and, in the case of blood, preferably a limb of the person to be tested is punctured so as to produce the drop of blood. As is seen in FIG. 5, the forefinger of hand 46 is punctured adjacent the finger tip. Card 12 is aligned with the drop of blood by visual observation of the blood through hole 44. Thus, the hole 44 aids in bringing the absorption area 40 on to the drop of blood. Hole 44 is sufficiently large for convenient sighting, and is sufficiently small so that the edges of hole 44 can all conveniently touch the drop of blood. Since the absorbent card 12 is of paper suitable for the use, the blood is soaked into the card within area 40. Such absorption continues into the area 40 until the blood reaches line 42. Due to the heat and pressure applied at line 42, continued spreading of the blood spot beyond that line is inhibited. However, since flow is inhibited beyond the line, the supply of blood is able to better fill the entire area 40.

The hole 44 is indicated in the drawings as being positioned substantially at the center of the circle defined by line 42. However, the circularity of line 42 is not critical, and in some cases it may be preferable to have the hole 44 positioned away from the center of the area 40. For example, for those cases in which the card is expected to be used in a vertical position, the hole 44 is preferably positioned toward the upper portion of the area 40. Thus, gravitational flow aids in distributing the supply of blood throughout the entire area 40. Furthermore, instead of the single hole 44 within the area 40, a large plurality of relatively small holes can be provided. Such perforations would be of such size and so spaced so that they provide adequate visibility through the card within the area 40. Thus, the card user can see the blood drop beyond the card and touch the card correctly upon the blood drop so that the area 40 is filled with blood.

After the body fluid is impregnated into as many of the areas 40 as is desired, in accordance with the P.K.U. test, the blood is permitted to dry upon the card. Thereupon coupons are punched out of the area 40 and placed in conjunction with suitable culture medium in a proper culture environment. As a result of the interaction of the blood with the medium, a biological test is made to determine the character of the blood.

This invention having been described in its preferred embodiment, it is clear that it is subject to numerous modifications and embodiments within the scope of this invention and without the exercise of the inventive faculty. Accordingly, the scope of this invention is defined by the scope of the following claims.

What is claimed is:

1. A card for medical testing, comprising a card of paper material absorbent to biological liquid, and a line on said card defining a particular area of said card, said line being formed of compressed and charred card material, whereby biological liquid absorbed by said particular area is inhibited from migrating past said line into the remainder of said card.

2. The card for medical testing of claim 1 wherein said line completely encloses on said card an area to be impregnated with biological liquid.

3. The card for medical testing of claim 2 wherein a hole is formed through said card within said area defined by said line, said hole being of such size as to aid in aligning said area with a source of biological liquid for impregnation of said area.

4. The card for medical testing of claim 3 wherein a plurality of areas are defined on said card by a plurality of said lines.

5. The card for medical testing of claim 3 wherein said line defines a substantially circular area, said hole is substantially circular and is located substantially centrally of said substantially circular area.

6. The card for medical testing of claim 3, wherein said absorbent card is substantially rectangular, indicia printed on said absorbent card, a writing sheet attached to said absorbent card adjacent one of the edges thereof and underlying said card, and indicia printed on said sheet corresponding to said indicia on said absorbent card.

7. The card for medical testing of claim 6 wherein said sheet terminates short of said absorption area on said absorbent card.

8. The process of producing a card for medical testing comprising the steps of providing a card of paper material absorbent to biological liquid, and inscribing thereon by the application of heat and pressure a line of compressed and charred card material which defines a particular area of said card to be impregnated with biological liquid and which inhibits migration of said liquid absorbed in said particular area to any adjacent area of said absorbent card.

References Cited

UNITED STATES PATENTS 3,319,621   5/1967   Schwerin _____ 128—2

RICHARD A. GAUDET, *Primary Examiner.*

S. BRODER, *Assistant Examiner.*

U.S. Cl. X.R.

101—32